Oct. 4, 1966  W. ALBRECHT  3,276,287
TELESCOPIC ARRANGEMENT
Filed July 19, 1963
2 Sheets-Sheet 1
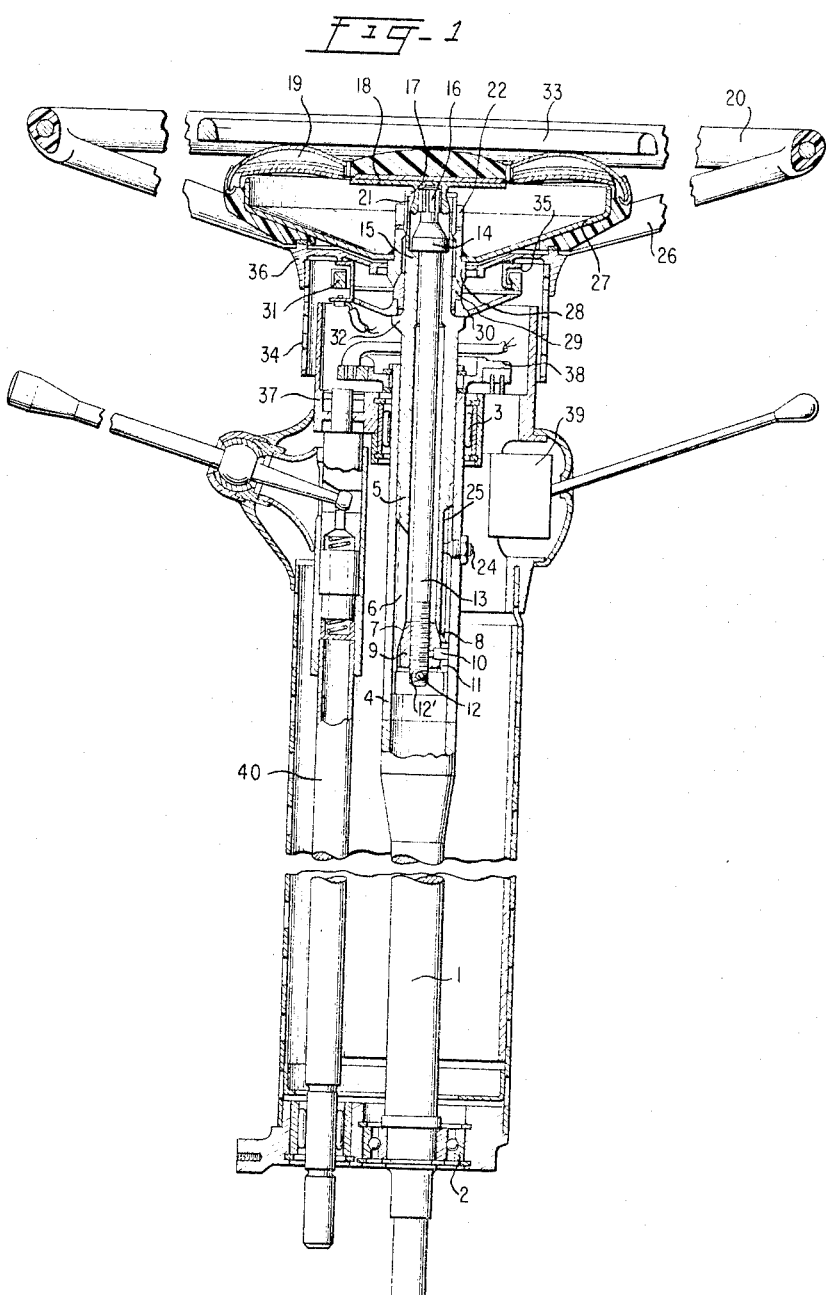
INVENTOR.
WILHELM ALBRECHT
BY
Dicke and Craig
ATTORNEYS Oct. 4, 1966 W. ALBRECHT 3,276,287
TELESCOPIC ARRANGEMENT
Filed July 19, 1963 2 Sheets-Sheet 2
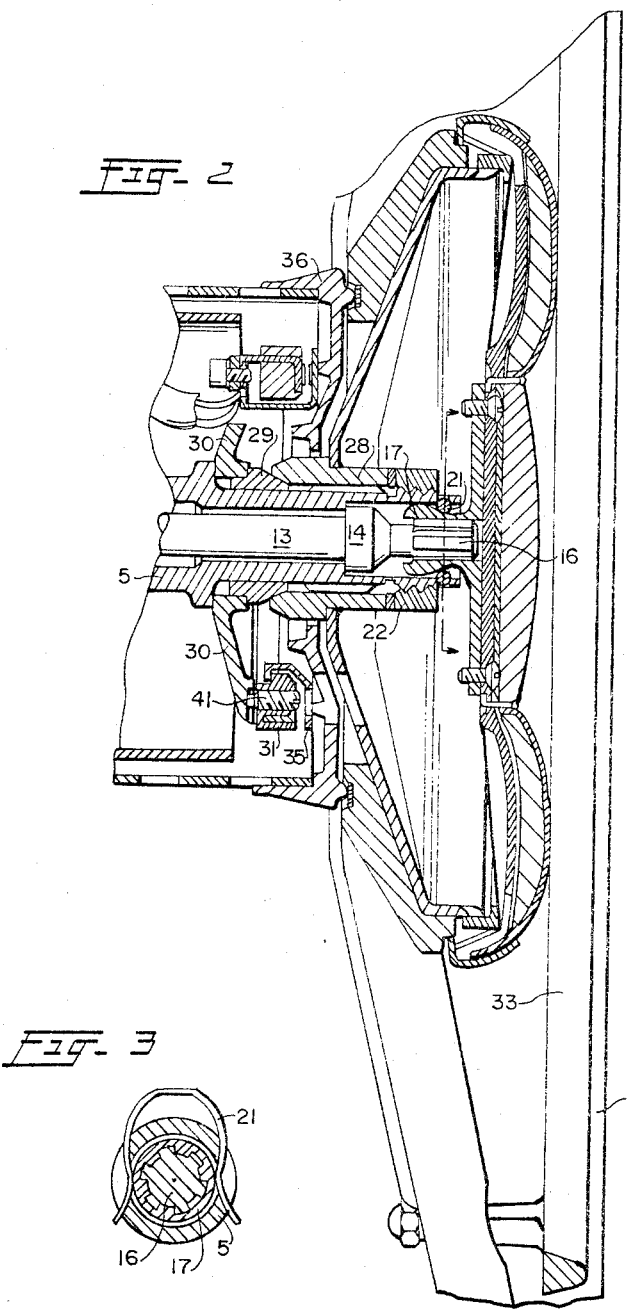
INVENTOR.
Wilhelm Albrecht
BY
Dicke + Craig
ATTORNEYS

United States Patent Office 3,276,287
Patented Oct. 4, 1966

3,276,287
TELESCOPIC ARRANGEMENT
Wilhelm Albrecht, Riet uber Vaihingen (Enz), Germany, assignor to Daimler-Benz Aktiengesellschaft, Stuttgart-Unterturkheim, Germany
Filed July 19, 1963, Ser. No. 296,293
Claims priority, application Germany, July 21, 1962, D 39,432
12 Claims. (Cl. 74—493)

The present invention relates to an arrangement for securing two parts, which are telescopically displaceable one within the other, in different positions, especially the parts of a steering spindle in a motor vehicle.

It is known in the prior art to make the steering spindle in a motor vehicle displaceable or slidable in the axial direction and to provide between the stationary and the displaceable part a shock absorber for absorbing shocks and impacts acting on the steering wheel. The driver is thereby to be protected against any excessively hard impacts against the steering wheel in case the vehicle is involved in an accident.

The present invention is directed to the aim of rendering two parts telescopically displaceable one within the other, especially parts of a steering spindle in a motor vehicle, capable of being secured in different positions for the purpose of matching the position of the steering wheel to the differing body sizes of the drivers and to produce thereby an individual adjustability. The solution in accordance with the present invention is that the inner hollow part for the spindle is adapted to be expanded outwardly along the section thereof extending within the other part and accommodates, as well as axially supports, a pull-rod by means of which the expandable section is to be expanded, and in that the pull rod is constructed at one of the ends thereof for the accommodation of a rotating member serving for purposes of rotary movement thereof. The construction according to the present invention produces a safe securing of the two parts adapted to be displaced one within the other in any desired position of the steering wheel, whereby relatively small actuating forces are required for the actuation of the securing mechanism. The use of a pull rod and of a clamping member produces a force-locking clamping connection of the inner part with respect to the outer part. The force-locking connection can additionally be improved by a form-locking connection in that the sections or portions sliding one within the other are provided with a toothed configuration. Also, the clamping member may be threadably mounted on the pull rod. By reason of the small diameter of the pull rod, a relatively small thread diameter is needed whereby only a small friction moment has to be overcome for moving the thread. Since the pull rod extends beyond the inner part, the size of the actuating element for purposes of rotating the pull rod can be chosen at will.

An appropriate further development and feature of a steering arrangement for a motor vehicle in accordance with the present invention essentially consists in that the outer hollow part is the end of a steering spindle and that the rotary member to be arranged at the pull rod is constituted by a disc covering a steering wheel hub and provided with a sleeve. The use of such an arrangement results in a simple and easy adjustability of the steering wheel in the axial direction of the steering spindle, and it is additionally possible to disengage and secure again in a simple manner, those members serving to effect securings.

A simple and reliable clamping or securing between the rotary member and the pull rod essentially is provided by the sleeve of the disc-shaped rotary member which is constructed externally in a spherically shaped manner and which serves as the place of engagement for a spring arranged at the end of the inner hollow part which spring seeks to hold the rotary member at the pull rod. By the use of such an arrangement, the rotary member may be readily detached in a simple manner from the pull rod and from the inner part. For that purpose, the connecting place of the rotary member with the pull rod is of splined construction.

Accordingly, it is an object of the present invention to provide an installation for securing two parts mutually displaceable one within the other in a telescopic manner, especially parts of a steering spindle in a motor vehicle which is simple in construction, reliable in operation, and avoids those shortcomings encountered with the prior art.

It is another object of the present invention to provide a securing arrangement for two telescopically arranged parts which permits individual adjustability by extremely simple means that may be readily actuated yet assure a reliable clamping of the parts.

A still further object of the present invention resides in the provision of a clamping arrangment for two telescopically adjustable parts, especially the parts of a steering spindle in motor vehicles which requires small actuating forces for the adjustment thereof, permits selection of a rotary adjusting member of any size, and enables a simple assembly and disassembly of the various parts.

These and other objects, features and advantages of the present invention will become more obvious from the following description when taken in connection with the accompanying drawing which shows, for purposes of illustration, only one embodiment in accordance with the present invention, wherein:

FIGURE 1 is a longitudinal cross section of one embodiment of a steering spindle, according to the present invention;

FIGURE 2 is a longitudinal cross section through a different portion of the steering spindle, of FIGURE 1, showing the elements in greater detail; and FIGURE 3 is a cross sectional view taken on line III—III of FIGURE 2.

Referring now to the drawing which shows one embodiment of a securing and clamping arrangement of a telescopically adjustable steering spindle for motor vehicles, reference numeral 1 designates therein the steering spindle of a motor vehicle which is suitably supported within ball bearing 2 and within the needle bearing 3. The bearings are operatively connected in any suitable manner (not illustrated) with a fixed part of the vehicle such as the frame of the framework or superstructure of a motor vehicle. The steering spindle 1 is provided along the upper end thereof with a tubular piece 4 within which a tubular piece or member 5 is axially displaceable. The tubular member 4 is provided with an internal toothed arrangement and the tubular member 5 with a corresponding external tooth arrangement so that the tubular member 5 is displaceable in the axial direction within the tubular member 4 but cannot be rotated relative thereto.

The tubular member 5 is provided at the end thereof within tubular member 4 with three slots 6 evenly distributed along the circumference, and possesses a conically shaped section 7 which cooperates with a conically shaped section 8 of a clamping member 9. A bolt 10 is seated within the clamping member 9 in the radial direction, which bolt 10 is guided within an aperture 11 of the tubular member 5 and serves for securing the clamping member 9 against relative rotation. The clamping member 9 is provided with a threaded bore receiving the external thread 12' of a pull rod 13 at the end of which there is provided a cross pin 12 for securing the clamping member 9. The pull rod 13 extends through the tubular member 5 up to the end thereof projecting out of the tubular member 4 and is provided with a collar 14 which is supported against the off-set 15 of the tubular member 5. A splined entrainment section 16 is provided at the free end of the pull rod 13 on which is seated a correspondingly constructed bushing 17 form-lockingly connected thereto. The bushing or sleeve 17 is provided with a flanged portion 18 which is connected with a padding 19 which, in turn, covers the hub portion of the steering wheel 20.

The sleeve 17 is constructed in a spherically shaped manner along the outer or external axial section thereof. A spring 21 of approximately U-shaped construction, which is inserted into the tubular member 5 and illustrated as cut transversely to the longitudinal axis thereof, engages with this spherically-shaped external section of the sleeve 17. The spring 21 seeks to hold the sleeve 17 in the illustrated position. The spring 21 is so inserted into two apertures at the free end of the tubular member 5 that it is secured in the axial direction of the tubular member 5.

For purposes of establishing or disengaging the force-locking connection between the tubular member 4 and the tubular member 5, padding 19 and therewith the flanged portion 18 is rotated in the closing or opening direction of the thread provided at the pull rod 13, whereby the clamping member 9 is displaced in the axial direction. When the conically shaped section 8 of the clamping member 9 abuts against the conically shaped section 7 of the tubular member 5, it presses the ends of the tubular member 5, which are separated by the slots, in the outward direction and causes abutment thereof against the tubular member 4. As a result thereof, the tubular member 5 is clamped within the tubular member 4. For purposes of disengagement of the clamping engagement between the tubular member 5 and the tubular member 4, the padding 19 and therewith the pull rod 13 is rotated in the opposite direction whereby the conically shaped section 8 of the clamping member 9 disengages from the conically shaped section 7 of the tubular member 5, and the tubular member 5 is thus adapted to be displaced axially by reason of the released force-locking engagement within the tubular member 4. The clamping engagement may be re-established in any selectively adjustable position of the two tubular members 4 and 5 with respect to each other by a corresponding rotation of the padding 19. In order to avoid any disengagement of the tubular member 5 from the tubular member 4, a screw 24 is threaded into the tubular member 4 and projects into a longitudinal slot 25 within the tubular member 5 which slot is limited in length.

The steering wheel 20 is secured with the spokes 26 thereof at a steering wheel support 27 whose hub portion 28 is placed on the tubular member 5 and retained thereat by means of a nut 22. The hub portion 28 is thereby supported against a conically shaped annular member 29 which retains a holder 30 for a contact ring 31 at a collar 32 of the tubular member 5. A hub portion 36 for signaling ring 33 is provided between the steering wheel support 27 and the contact ring 31 which hub portion is adapted to be axially displaceable along a protective cover section 34 of a protective cover surrounding the steering spindle 1. Springs 35 seek to keep the hub portion 36 of the signaling ring 33 at a distance from the contact ring 31. The maximum distance of the contact ring 31 from the signaling ring 33 is adjustable in the assembled condition with the aid of adjusting screws 41, shown in FIGURE 2, threaded into the contact ring and accessible from the outside through appropriate apertures in spring 35, hub portion 36 and support 27.

A steering housing 37 surrounding the tubular members 4 and 5 accommodates a slide ring support 38 connected with the contact ring 31 as well as at least partially a turn indicator switch 39 and a shifting rod 40 for purposes of shifting and engaging the various transmission speeds of an internal combustion engine.

While I have shown and described one embodiment in accordance with the present invention, it is understood that the same is not limited thereto, but is susceptible of numerous changes and modifications within the spirit and scope thereof as known to a person skilled in the art, and I therefore do not wish to be limited to the details shown and described herein, but intend to cover all such changes and modifications as are encompassed by the scope of the appended claims.

I claim:
1. An axially adjustable device, comprising: an outer hollow member, an inner hollow member having a portion thereof telescopically extending within said outer hollow member and including expandable means to be expanded outwardly into gripping engagement with said outer hollow member, pull rod means having one end axially supported within said portion of the inner hollow member, clamping means carried by said one end of the pull rod means and being operable upon rotation of said pull rod means to engage and expand said expandable means against said outer hollow member to clamp said inner and outer hollow members together, actuating means on the other end of said pull rod means imparting rotary movements to said pull rod means, and inter-engaging means preventing relative rotation between said inner hollow member and said outer hollow member.

2. An adjustable steering device for a motor vehicle, comprising: a hollow steering spindle, a hollow member having a portion telescopically extending within said hollow steering spindle including expandable means to be expanded outwardly to clamp against said hollow steering spindle, pull rod means having one end axially supported within said portion of said hollow member, clamping means carried by said pull rod means and secured against rotation relative to said hollow member and being operable upon rotation of said pull rod means to engage and expand said expandable means against said hollow steering spindle to clamp said hollow member against said hollow steering spindle, actuating means on the other end of said pull rod means to rotate said pull rod means, said steering device having a steering wheel hub portion, and said actuating means including a disc-like member covering said steering wheel hub portion.

3. The device of claim 2, wherein said actuating means includes a depending portion constructed externally of spherical shape, and further including spring means arranged at the end of said hollow part, said spring means being operable to hold said actuating means on said pull rod means by engaging said spherical shape of said sleeve portion.

4. The device of claim 3, further including a signaling ring and support means for said signaling ring arranged between said steering wheel hub portion and said steering spindle for supporting said signaling ring between the outer rim of the steering wheel and said hub portion.

5. The device of claim 2, further including a signaling ring and support means for said ring arranged between said steering wheel hub portion and said steering spindle supporting said signaling ring between the outer rim of the steering wheel and said hub portion.

6. The device of claim 2, wherein said steering wheel hub portion is secured to the end of said hollow member extending beyond said steering spindle, and said actuating means includes a depending sleeve telescopically encircling the end of said pull rod means, said sleeve having a portion of increased size at its lower terminal end, and further including inter-engaging means preventing rotation between said actuating means and said pull rod, spring means on said hollow member engaging said sleeve above said portion of increased size to retain said actuating means on said pull rod means.

7. The device of claim 6, including a signaling ring, support means for said ring arranged between said steering wheel hub portion and said steering spindle supporting said signaling ring for limited signalling movement between the outer rim of the steering wheel and said hub portion, contact ring means mounted on said hollow member normally spaced from said support means forming a signal-carrying circuit upon contact with said support means, spring means mounted on said contact ring pressing said signaling ring into its normal position spaced from said contact ring and against the steering wheel hub portion.

8. The device of claim 7, including means being operable to adjust the maximum distance between said contact ring and said signaling ring support means in the installed and assembled condition of the steering device.

9. A steering device for a motor vehicle, comprising: a steering wheel, a first hollow elongated member, a second hollow elongated member having a lower end telescopically received in said first hollow member and an upper end carrying said steering wheel, an elongated rod mounted for rotation within said second hollow member having a threaded portion at its lower end, said lower end of said second hollow member having resilient means expandable into clamping engagement with said first hollow member, cam means threadingly received on the lower end of said rod axially displaceable upon rotation of said rod for expanding said resilient means into clamping engagement with said first hollow member, a disklike actuating member covering the hub of said steering wheel having a depending sleeve portion telescopically received on the upper end of said rod, inter-engaging means connecting said rod and said sleeve preventing relative rotation and allowing axial disengagement, and releasable catch means on the end of said second hollow member locking said sleeve against axial disengagement.

10. A device of claim 9, wherein said sleeve has a convexly shaped outer portion and said releasable catch means includes a spring resiliently engaging said convexly shaped portion.

11. The device of claim 10, including a signal contact ring mounted on said second hollow member below said steering wheel hub, a protective cover surrounding said contact ring and said upper portion of said second hollow member and mounted for axial movement relative to said contact ring.

12. The device according to claim 11, including abutment means on said upper portion of said second hollow member, said contact ring including a hub portion surrounding said second hollow member and in abutting engagement with said abutment means, said wheel hub portion surrounding said second hollow member in abutting engagement with said hub portion of said contact ring, means threaded on said second hollow member forcing said wheel hub portion into engagement with said contact ring hub portion and said contact ring hub portion into engagement with said abutment means.

References Cited by the Examiner
UNITED STATES PATENTS

| | | | |
|---|---|---|---|
| 1,258,647 | 3/1918 | Bowers | 287—126 X |
| 2,475,927 | 7/1949 | Vederber | 287—126 X |
| 2,987,936 | 6/1961 | Selle et al. | 74—493 |

MILTON KAUFMAN, *Primary Examiner.*